United States Patent
Faulk, Jr.

(10) Patent No.: US 10,044,643 B2
(45) Date of Patent: *Aug. 7, 2018

(54) VIRTUAL INSERTION INTO A NETWORK

(71) Applicant: HEWLETT PACKARD ENTERPRISE DEVELOPMENT LP, Houston, TX (US)

(72) Inventor: Robert L. Faulk, Jr., Roseville, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 57 days.

This patent is subject to a terminal disclaimer.

(21) Appl. No.: 15/163,106

(22) Filed: May 24, 2016

(65) Prior Publication Data

US 2016/0269323 A1  Sep. 15, 2016

Related U.S. Application Data

(63) Continuation of application No. 12/707,046, filed on Feb. 17, 2010, now Pat. No. 9,350,702.

(51) Int. Cl.
| | |
|---|---|
| *H04L 12/26* | (2006.01) |
| *H04L 12/939* | (2013.01) |
| *H04L 29/06* | (2006.01) |
| *H04L 12/28* | (2006.01) |
| *H04L 29/12* | (2006.01) |

(52) U.S. Cl.
CPC .......... *H04L 49/55* (2013.01); *H04L 12/2854* (2013.01); *H04L 29/06* (2013.01); *H04L 61/6022* (2013.01); *H04L 61/6068* (2013.01); *H04L 63/02* (2013.01); *H04L 63/0272* (2013.01); *H04L 63/0428* (2013.01); *H04L 69/22* (2013.01)

(58) Field of Classification Search
CPC ..... H04L 49/55; H04L 12/2854; H04L 29/06; H04L 61/6022; H04L 61/6068; H04L 63/02; H04L 63/0272; H04L 63/0428; H04L 63/22

See application file for complete search history.

(56) References Cited

U.S. PATENT DOCUMENTS

| | | | | |
|---|---|---|---|---|
| 5,623,605 | A * | 4/1997 | Keshav | H04L 12/2856 370/392 |
| 5,910,987 | A * | 6/1999 | Ginter | G06F 21/10 348/E5.006 |
| 6,640,278 | B1 * | 10/2003 | Nolan | G06F 3/0601 707/999.001 |

(Continued)

OTHER PUBLICATIONS

Anand Gorti and Vijoy Pandey, "OSF-Open Service Framework: An Integrated High-speed Load Balancing and Flow Steering Framework," In Proceedings of First Workshop on Data Center—Converged and Virtual Ethernet Switching, DC-CAVES, 2009, pp. 1-6.

*Primary Examiner* — Kevin Mew
(74) *Attorney, Agent, or Firm* — Hewlett Packard Enterprise Patent Department (57) ABSTRACT

A network appliance is virtually inserted in a data path within a network. Packet data that matches a criteria is intercepted at a logical point within the data path. The intercepted packet data is forwarded to an application running on the virtually inserted network appliance.

21 Claims, 5 Drawing Sheets

(56) References Cited

U.S. PATENT DOCUMENTS

| | | | |
|---|---|---|---|
| 6,934,749 B1* | 8/2005 | Black | G06F 1/14 |
| | | | 709/217 |
| 7,965,729 B2* | 6/2011 | Veeraraghavan | H04L 1/22 |
| | | | 370/428 |
| 8,036,229 B2 | 10/2011 | Banerjee | |
| 8,601,498 B2* | 12/2013 | Laurich | G06F 21/602 |
| | | | 711/114 |
| 8,892,708 B2 | 11/2014 | Merrill et al. | |
| 2003/0069973 A1* | 4/2003 | Ganesan | H04L 29/06 |
| | | | 709/226 |
| 2007/0005786 A1* | 1/2007 | Kumar | G06F 8/656 |
| | | | 709/230 |
| 2007/0140128 A1* | 6/2007 | Klinker | H04L 29/06 |
| | | | 370/238 |
| 2007/0156919 A1* | 7/2007 | Potti | G06F 8/67 |
| | | | 709/238 |
| 2007/0171921 A1* | 7/2007 | Wookey | G06F 3/1415 |
| | | | 370/401 |
| 2007/0245409 A1* | 10/2007 | Harris | H04L 63/0272 |
| | | | 726/5 |
| 2008/0046549 A1 | 2/2008 | Saxena et al. | |
| 2009/0193129 A1* | 7/2009 | Agarwal | H04L 63/0281 |
| | | | 709/229 |
| 2009/0300605 A1 | 12/2009 | Edwards et al. | |
| 2009/0303883 A1 | 12/2009 | Kuchzrczyk et al. | |
| 2010/0217837 A1* | 8/2010 | Ansari | G06Q 30/04 |
| | | | 709/218 |
| 2011/0191442 A1* | 8/2011 | Ovsiannikov | H04L 63/0272 |
| | | | 709/218 |
| 2012/0281708 A1* | 11/2012 | Chauhan | H04L 63/0272 |
| | | | 370/401 |

\* cited by examiner

VIRTUAL INSERTION INTO A NETWORK

BACKGROUND

In a computer network, clients connect to network switches and/or routers, which frequently connect to the Internet. Various network appliances (e.g., Intrusion Prevention Systems (IPS), wide area network (WAN) accelerators, monitoring and/or troubleshooting devices, etc.) can be connected to the network for various purposes.

BRIEF DESCRIPTION OF DRAWINGS

The following description includes discussion of figures having illustrations given by way of example of implementations of embodiments of the invention.

DETAILED DESCRIPTION

Network appliances (e.g., IPS, WAN accelerators, monitoring and/or troubleshooting devices, etc.) can be added to a network by physically reconnecting network cables to get these appliances into the data path of the network. However, physically reconnecting network cables can be burdensome, especially in a dynamic network environment. In addition, physical connections may limit where in the data path an appliance may be inserted. Embodiments described herein enable virtual insertion of a network appliance into a network at desired point in the data path.

Policy based routing allows routed IP (Internet Protocol) packets matching a certain pattern to be forwarded to the designated next hop gateway (on a designated port and VLAN). Furthermore, with policy based routing, packets are modified in a specific manner—for example, the source MAC (Media Access Control) address is changed to be that of the router, the destination MAC address is changed to be that of the next hop gateway, and the VLAN is changed. Thus, in policy based routing, the next hop gateway is not given the original form of the packet. Various embodiments enable network appliances to receive the original unmodified form of a packet, or other forms. Furthermore, as described, various embodiments enable a network appliance to reinject a packet back into the forwarding data path (or simply data path) in its original unmodified form.

Figure 1:
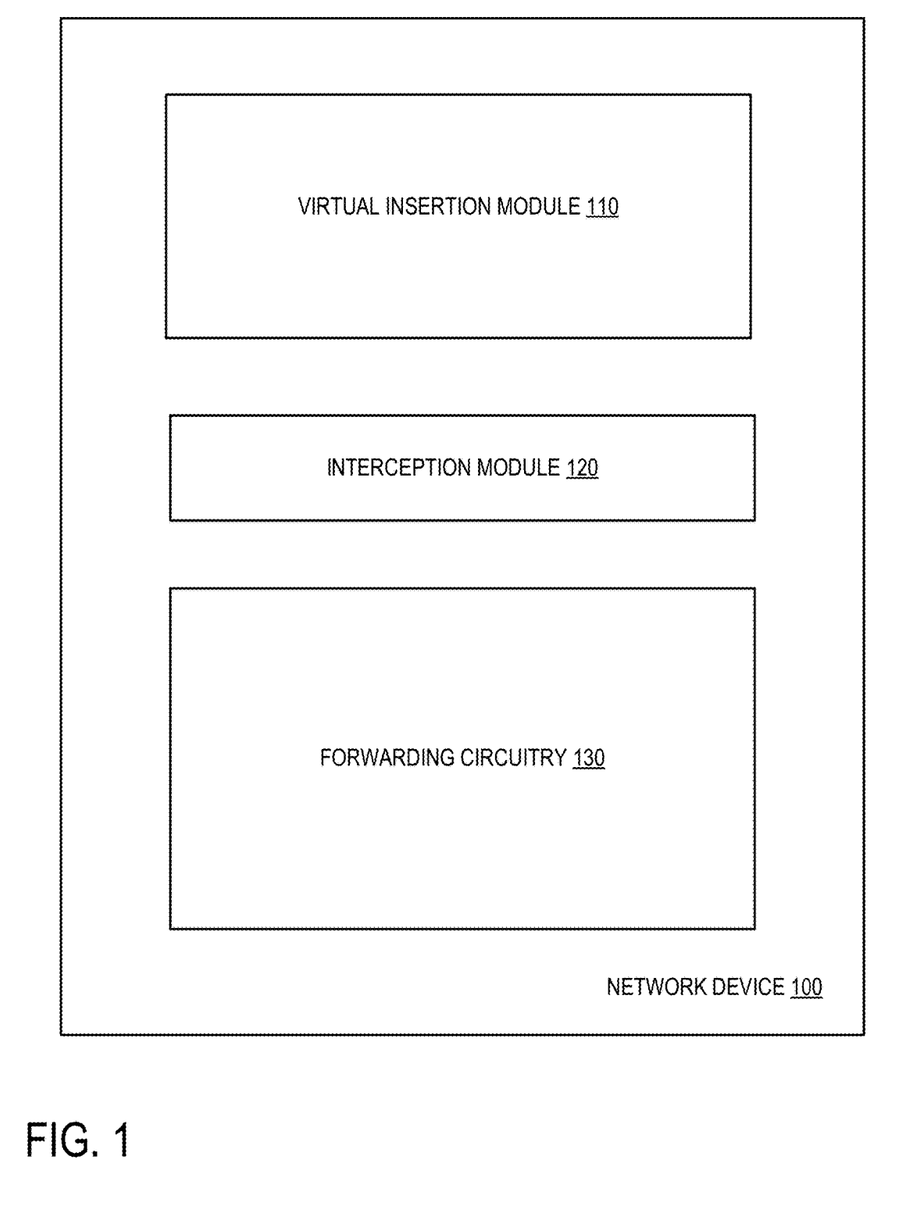
FIG. 1 is a block diagram illustrating a device according to various embodiments.

FIG. 1 is a block diagram illustrating a system according to various embodiments. Network device 100 may be any device that connects network segments and/or connects other devices to each other (e.g., an OSI layer 2 bridge, OSI layer 3 router, etc.). As illustrated, network device 100 includes a virtual insertion module 110, an interception module 120, and forwarding circuitry 130. The components (i.e., modules, circuitry, etc.) shown in FIG. 1 may be logically and/or physical combined in various embodiments. In alternate embodiments, network device 100 may have more components, fewer components, and/or different components. The various components shown in FIG. 1 can be implemented as one or more software modules, hardware modules, special-purpose hardware (e.g., application specific hardware, application specific integrated circuits (ASICs), embedded controllers, hardwired circuitry, etc.), or some combination of these.

Virtual insertion module 110 controls virtual insertion of a network appliance into a forwarding data path. Specifically, virtual insertion module 110 inserts a network appliance into the data path based on a data tap. Data taps are described in more detail below. As used herein, a network appliance includes network devices that receive data (e.g., packet data), optionally perform some modification on the data (e.g., adding/changing a packet header, etc.), and optionally return the data back into the network. Examples of network appliances might include an Intrusion Prevention System (IPS), WAN (wide area network) accelerators, monitoring devices, troubleshooting devices, and the like. Networking devices that perform routing and/or switching functionality, along with the network appliance functionality described above, may also be considered network appliances in certain embodiments.

In various embodiments, virtual insertion module 110 defines data taps, defines application paths, and binds application paths to data taps, described in more detail below.

Interception module 120 intercepts data packets. Interception criteria may be based on, but are not limited to, raw ports, address-based forwarding, flow-based forwarding, ingress and/or egress classification, logical and/or physical ports, packet contents, packet flags, flow state, etc. In addition, a software agent running on network device 100 might be used as interception criteria. For example, the software agent might have its own criteria for receiving packets. Interception module 120 can be configured to intercept packets picked up by the software agent. In certain embodiments, intercepting packets via comparing packets against the criteria can be performed by hardware (e.g., on the network device ASIC) with no software involvement.

Forwarding circuitry 130 handles the forwarding of intercepted packet data to the network appliance.

Figure 2:
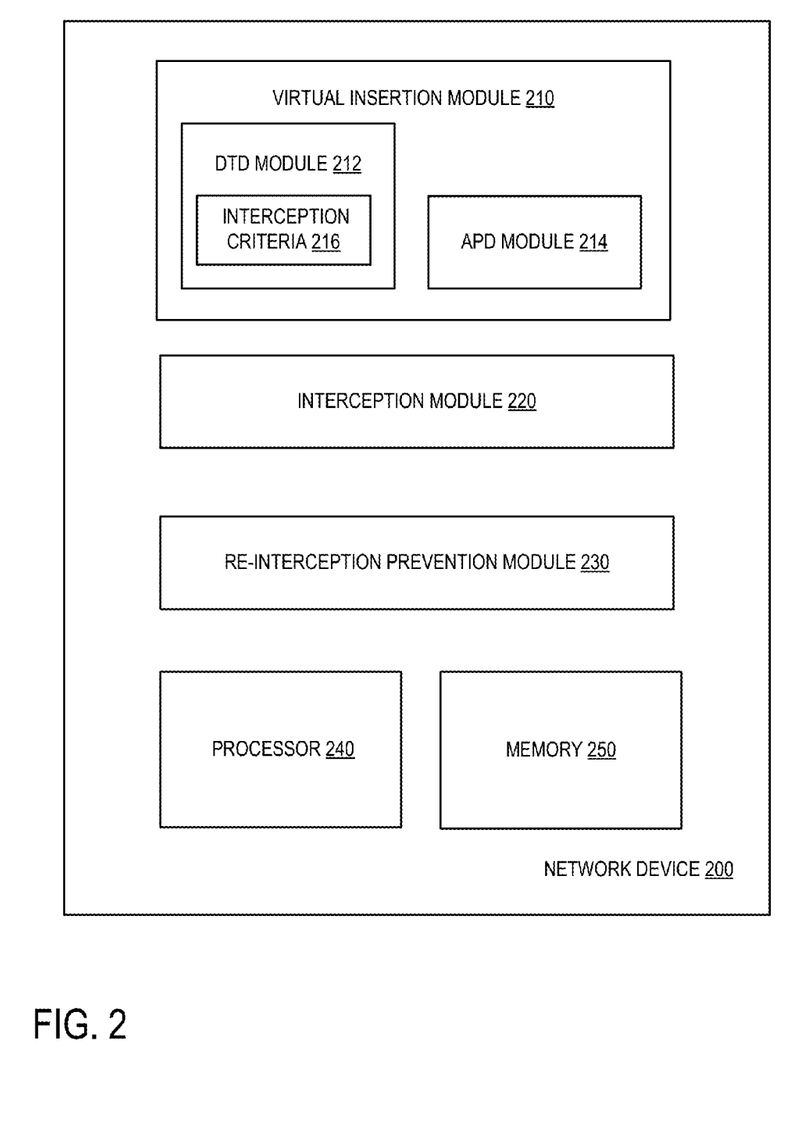
FIG. 2 is a block diagram illustrating a device according to various embodiments.

FIG. 2 is a block diagram illustrating another system according to various embodiments. Similar to network device 100, network device 200 includes a virtual insertion module 210 and an interception module 220. Also included are a re-interception prevention module 230, a processor 240 and memory 250. The various components, modules, etc. shown in FIG. 2 can be implemented as one or more software modules, hardware modules, special-purpose hardware (e.g., application specific hardware, application specific integrated circuits (ASICs), embedded controllers, hardwired circuitry, etc.), or some combination of these.

Virtual insertion module 210 virtually inserts one or more network appliances into the forwarding data path using a data tap descriptor (DTD) module 212 and an application path descriptor (APD) module 214.

DTD module 212 defines data taps. As used herein, a data tap describes a logical point in a forwarding data path for intercepting data packets. Given that many packet processing tasks are handled concurrently (e.g., by an ASIC) in a networking device, the logical point described by the data tap can be considered a function of priority and/or precedence. Using packet ingress as an example, a network device might give precedence to rate limiting over MAC (Media Access Control) security, or give precedence to port authentication over OSI Layer 2 (L2) learning. By defining a logical point within a group of prioritized packet processing operations, data taps allow a network appliance to virtually tap into any logical location in the data path. Rather than being limited to a fixed or default point in the data path, DTD module 212 can be dynamically updated to tap into multiple different logical locations in the data path.

In various embodiments, DTDs (data tap descriptors) are described using the GPPC (General Purpose Packet Control) MIB (management information base) and a policy-based forwarding CLI (command line interface) syntax. Other suitable schemes, protocols, syntaxes, etc. could be used in different embodiments. The GPPC MIB is one example of a tool that can specify where in the forwarding data path to locate a data tap. The data path may include a variety of logical locations—both ingress and egress—including, but not limited to, filtering, classification, L2 learning, link layer protocols, port authentication, MAC security, rate limiting, raw ports, software agents, NPU (network processing unit), etc. In one example, DTD module 212 may define an ingress data tap to intercept a pre-routed form (e.g., with respect to network device 200) of a data packet and/or an egress data tap to intercept a post-routed form (e.g., with respect to network device 200) of a data packet.

APD module 214 defines the application path between the network appliance and the data tap. More particularly, in various embodiments, APD module 214 defines the path between an application running on the network appliance and the data tap. In some embodiments, an application path may be defined for an application running on a device other than a network appliance. In various embodiments, application paths may be represented as network interfaces to x86 applications and/or switch agents. One or more tunnel drivers can be used to convert various encapsulations and/or unencapsulated data to network interfaces. Different interface configuration parameters may be used depending on the interface type (e.g., raw Ethernet, GRE/IPSec, PCI Express, proprietary encapsulations, etc.).

APDs (application path descriptors) may be configured using standard interface MIBs when standard encapsulations are used and proprietary MIBs for proprietary encapsulations. In various embodiments, APDs are bound to DTDs using the GPPC MIB and/or policy-based forwarding CLI syntax. Other schemes, protocols, syntaxes, etc. could be used for binding in different embodiments.

Interception module 220 intercepts data packets based on interception criteria 216 which can be dynamically updated. Interception criteria may be based on, but are not limited to, raw ports, address-based forwarding, flow-based forwarding, ingress and/or egress classification, logical and/or physical ports, packet contents, packet flags, flow state, etc. In addition, a software agent running on network device 200 might be used as an interception criterion. For example, the software agent might have its own criteria for receiving packets. Interception module 220 can be configured to intercept packets picked up by the software agent. In certain embodiments, intercepting packets via comparing packets against the criteria can be performed by hardware (e.g., on the device ASIC) with no software involvement.

In certain embodiments, interception module 220 prevents intercepted packets (or a portion of an intercepted packet) from being copied or sent to any location other than the destination defined by the corresponding APD. Re-interception prevention module 230 prevents previously intercepted packets from being re-intercepted by a data tap.

The various components, modules, functions, etc. described with respect to FIG. 2 may be implemented as instructions stored on a computer-readable storage medium (e.g., memory 250) and executed by a processor (e.g., processor 240).

Figure 3:
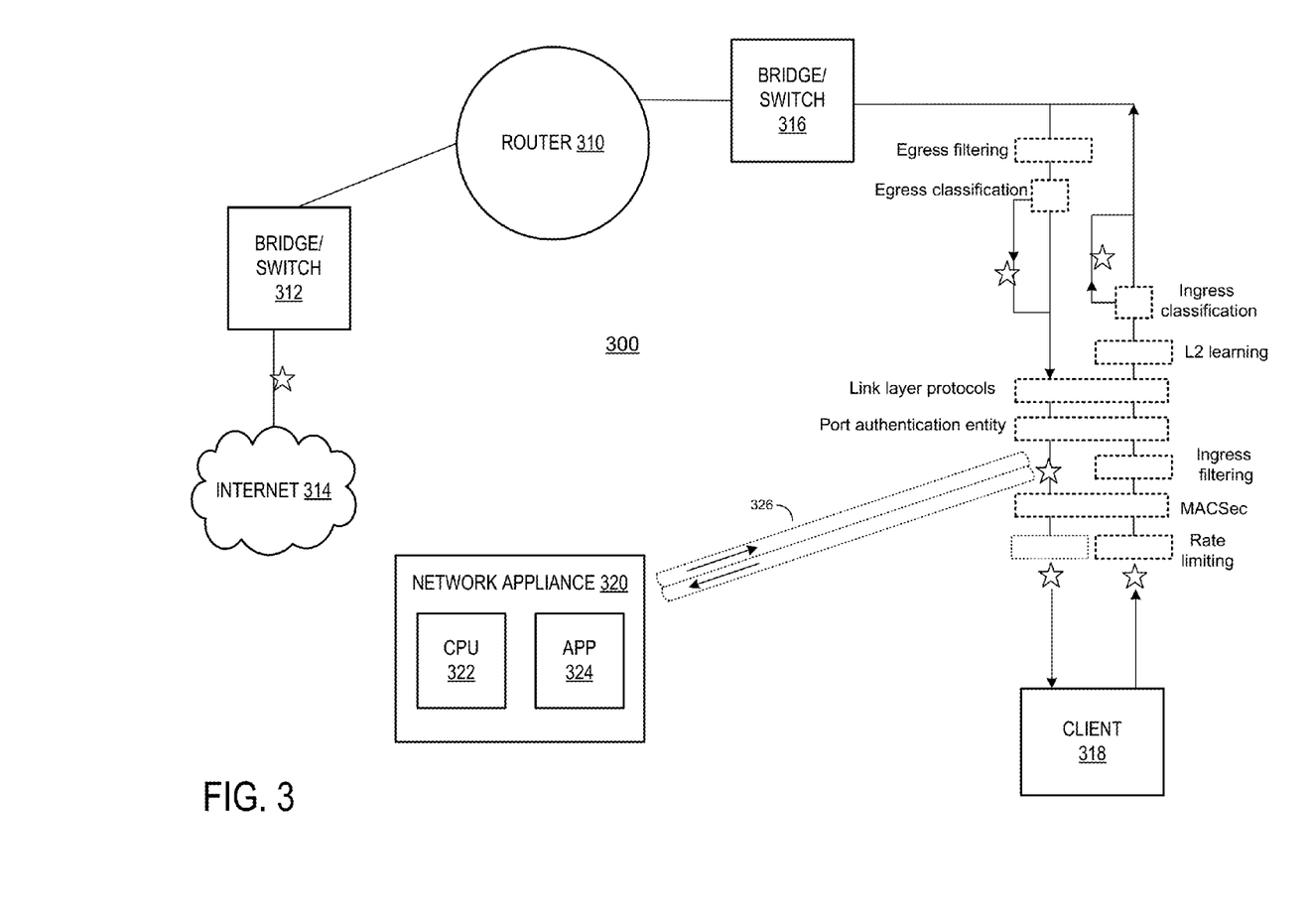
FIG. 3 is a block diagram illustrating a system according to various embodiments.

FIG. 3 is a block diagram illustrating a network system according to various embodiments. As shown, network 300 includes a router 310, multiple bridges 312, 316. Switch 312 connects to the Internet 314. Client 318 connects to switch 316. Starred locations in FIG. 3 indicate examples of logical locations for the data taps described herein. Other suitable logical locations (e.g., more, fewer, different locations) could be used in different embodiments. Network appliance 320 and/or application 324 are virtually inserted into the data path of network 300 via application path 326. As shown, application path 326 is intended to illustrate an example of a path between network appliance 320 and a data tap (illustrated by a star). In various embodiments, application path 326 is a bi-directional path, however it could be a unidirectional path if network appliance 320 were used for monitoring only.

Various logical packet processing operations are shown in the path between switch 316 and client 318 for ease of illustration. In practice, such packet processing operations are actually performed within switch 316 in various embodiments. As discussed above, packet processing operations may be handled concurrently by a network device (e.g., switch 316) and thus, the logical flow illustrated in FIG. 3 is based on a priority or precedence of operations—both for ingress and egress—with respect to switch 316.

Network 300 may be implemented as separate network devices in some embodiments or some or all of network 300 could be implemented in a single ASIC or CPU in other embodiments.

Figure 4:
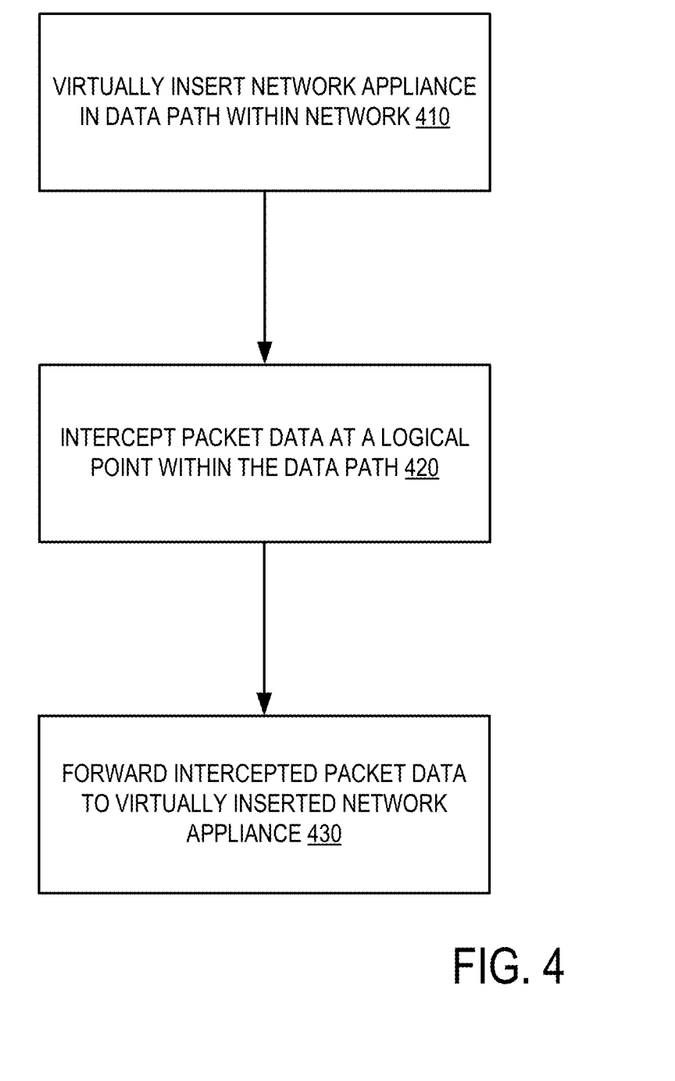
FIG. 4 is a flow diagram of operation in a system according to various embodiments.

FIG. 4 is a flow diagram of operation in a system according to various embodiments. An entity virtually inserts 410 a network appliance in a data path within a network. Inasmuch as the logical flow of the data exists within a network device, the network device (e.g., a virtual insertion module within the network device) acts as the inserting entity in various embodiments. As described above, the inserting entity can be implemented as one or more software modules, hardware modules, special-purpose hardware (e.g., application specific hardware, application specific integrated circuits (ASICs), embedded controllers, hardwired circuitry, etc.), or some combination of these.

By virtually inserting a network appliance, physical re-cabling and reconnecting can be avoided. In various embodiments, the virtual insertion is dynamic, meaning that the virtual location of the network appliance in the data path can be changed and updated (e.g., via data tap descriptors and application path descriptors) without the need to physically move the network appliance. The virtual insertion is also dynamic in that the data tap location may be changed and updated.

The network device intercepts 420 packet data at a logical point within the data path on the network based, at least in part, on a criterion. The criterion (or criteria) could be flow-based, port-based, classification-based, or based on any other suitable packet-related attribute.

In various embodiments, the network device forwards 430 intercepted packet data to an application running on the virtually inserted network appliance. In alternate embodiments, intercepted packet data may be forwarded to any location capable of processing (e.g., with a processing unit) the packet data.

Figure 5:
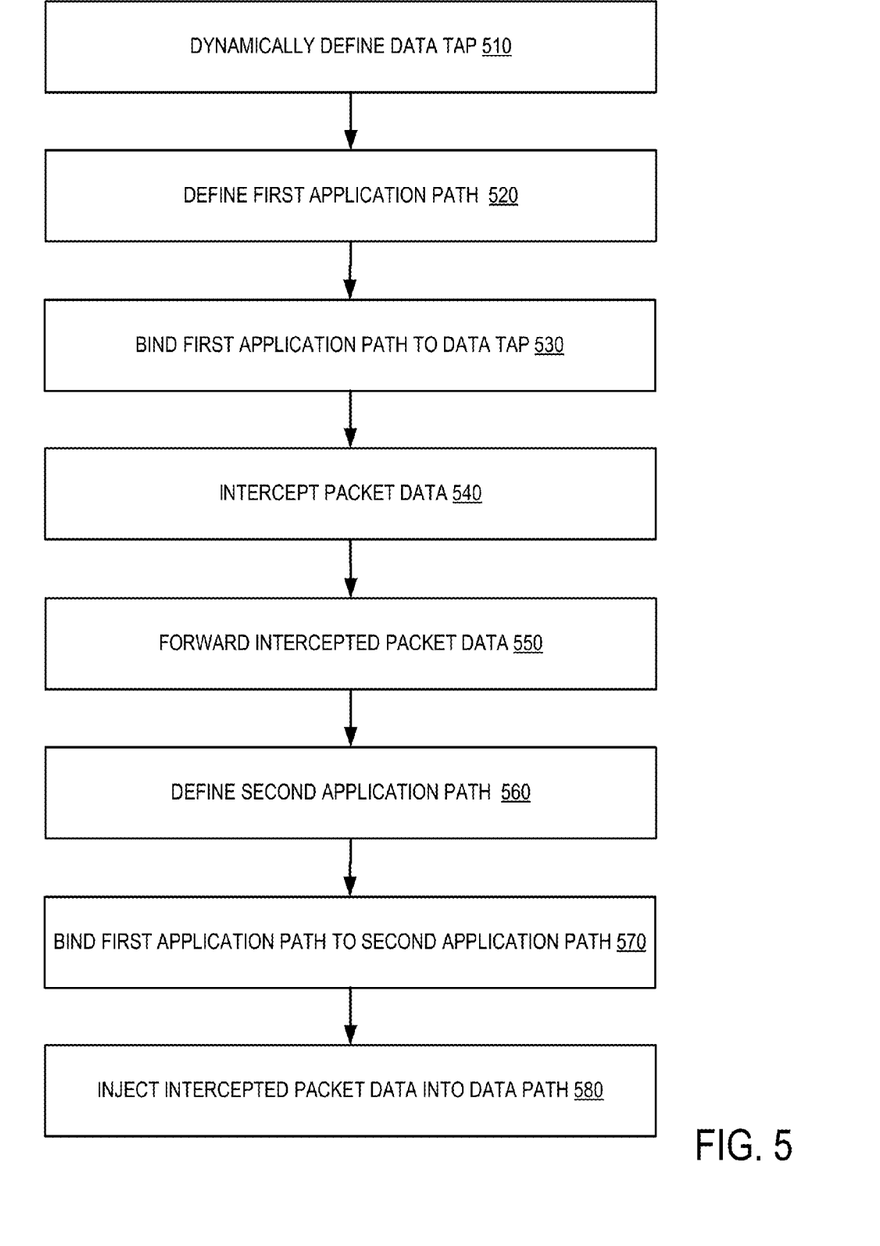
FIG. 5 is a flow diagram of operation in a system according to various embodiments.

FIG. 5 is a flow diagram of operation in a system according to various embodiments. To effectuate the virtual insertion described above, the system (or component, module, etc. thereof) dynamically defines 510 a data tap that describes a logical point within a data path to intercept data. For example, a data tap might specify a logical data path point between egress filtering and egress classification. Or, in another example, a data tap might specify the logical point in the data path between port rate limiting and the application of MAC security. Other logical points in the data path could be described by a data tap. Data taps are dynamic in various embodiments given that they may be updated and/or changed, for example, based on network conditions or other suitable factors.

The system defines 520 at least a first application path from a data tap to an application running on a virtually inserted network appliance. Application paths can be defined as network interfaces using MIBs, tunnel drivers, encapsulations, DMAs (direct memory accesses), or other suitable techniques.

The system binds 530 the first application path to the data tap. The binding combination of the application path and the data tap results in the virtual insertion of the network appliance at the logical location defined by the data tap.

Having virtually inserted the network appliance via binding an application path to a data tap, the system intercepts 540 packet data at the logical point in the data path defined by the data tap. Intercepted data is forwarded 550 to the virtually inserted network appliance. In various embodiments, the intercepted data is forwarded to an application running on the network appliance. In other embodiments, the intercepted data may be forwarded elsewhere on the network.

In certain embodiments, the system may define 560 a second application path from the data tap. Binding 570 the first application path to the second application path allows different application to be chained together at a particular data tap.

Intercepted packet data may be processed, modified, etc. by the application (or network appliance, etc.) receiving the intercepted data. In various embodiments, intercepted packets are injected 580 back into the data path (e.g., by the virtually inserted network appliance). In some embodiments, packets are injected in a pre-interception format. In other words, packets are injected such that there is no indication that they were intercepted in the first place. In other embodiments, packets are injected back into the data path in some other format.

The invention claimed is:

1. A method, comprising:
   virtually inserting, by a system comprising a processor, a network appliance in a data path within a network, wherein virtually inserting the network appliance in the data path comprises dynamically defining a data tap that describes a logical point within the data path to intercept data;
   defining, by the system, a first application path from the data tap to a first application running on the network appliance;
   defining, by the system, a second application path from the data tap to a second application; and
   binding, by the system, the first application path to the second application path, the binding causing chaining of the first and second applications together at the data tap.

2. The method of claim 1, further comprising:
   binding the first application path to the data tap; and
   binding the second application path to the data tap.

3. The method of claim 1, wherein intercepting the data packet comprises:
   performing highest precedence interception on the data packet when multiple data taps are defined in the network.

4. A network device, comprising:
   a processor; and
   a non-transitory storage medium storing instructions executable on the processor to:
   virtually insert a network appliance in a data path within a network by dynamically defining a data tap that describes a logical point within the data path to intercept data;
   define a first application path from the data tap to a first application running on the network appliance;
   define a second application path from the data tap to a second application; and
   bind the first application path to the second application path, the binding causing chaining of the first and second applications together at the data tap.

5. The network device of claim 4, wherein the instructions are executable on the processor to:
   use a data tap descriptor to define the data tap that describes the logical point within the data path to intercept data; and
   use application path descriptors to define the first and second application paths.

6. The network device of claim 5, wherein the instructions are executable on the processor to dynamically update the data tap descriptor to define the data tap at another logical point in the network.

7. The network device of claim 5, wherein the instructions are executable on the processor to:
   define an ingress data tap to intercept a pre-routed form of a data packet and an egress data tap to intercept a post-routed form of a data packet.

8. The network device of claim 4, wherein the instructions are executable on the processor to:
   prevent a previously intercepted data packet from being re-intercepted by the data tap.

9. A non-transitory computer-readable storage medium containing instructions that, when executed, cause a computer to:
   virtually insert a network appliance in a data path within a network, wherein virtually inserting the network appliance in the data path comprises dynamically defining a data tap that describes a logical point within the data path to intercept data;
   define a first application path from the data tap to a first application running on the network appliance;
   define a second application path from the data tap to a second application; and
   bind the first application path to the second application path, the binding causing chaining of the first and second applications together at the data tap.

10. The non-transitory computer-readable storage medium of claim 9, wherein the instructions when executed cause the computer to:
    concurrently route intercepted data packets from multiple different physical ports to the virtually inserted network appliance.

11. The non-transitory computer-readable storage medium of claim 9, wherein the instructions when executed cause the computer to:
    modify a data packet received from the virtually inserted network appliance to a pre-interception format.

12. The non-transitory computer-readable storage medium of claim 9, wherein the instructions when executed cause the computer to:
    use a data tap descriptor to dynamically define the data tap.

13. The non-transitory computer-readable storage medium of claim 12, wherein the instructions when executed cause the computer to:
    modify the data tap descriptor to define the data tap at a different logical point in the network to intercept data;

automatically modify an application path descriptor to define a new application path between the virtually inserted network appliance and the modified data tap.

14. The method of claim 1, wherein defining the second application path comprises defining the second application path from the data tap to the second application on the network appliance.

15. The method of claim 1, wherein defining the second application path comprises defining the second application path from the data tap to the second application on another network appliance.

16. The method of claim 1, further comprising:
intercepting, by the system, a data packet matching a criterion at the logical point within the data path in the network; and
forwarding, by the system, the intercepted data packet to the first application running on the virtually inserted network appliance.

17. The network device of claim 4, wherein the instructions are executable on the processor to:
intercept a data packet matching a criterion at the logical point within the data path in the network; and
forward the intercepted data packet to the first application running on the virtually inserted network appliance.

18. The non-transitory computer-readable storage medium of claim 9, wherein the instructions when executed cause the computer to:
intercept a data packet matching a criterion at the logical point within the data path in the network; and
forward the intercepted data packet to the first application running on the virtually inserted network appliance.

19. The method of claim 16, further comprising:
injecting, by the virtually inserted network appliance, the intercepted packet data packet into the data path.

20. The method of claim 16, wherein the criterion for intercepting the data packet includes a criterion relating to whether the data packet is traveling to or from an agent of a switch.

21. The network device of claim 17, wherein the instructions are executable on the processor to:
prevent an intercepted data packet or a portion of the intercepted data packet from being copied to a location other than the network appliance.

* * * * *